United States Patent [19]

Hoogenboom

[11] Patent Number: 4,701,610

[45] Date of Patent: Oct. 20, 1987

[54] FIBER OPTIC PROXIMITY SENSORS FOR NARROW TARGETS WITH REFLECTIVITY COMPENSATION

[75] Inventor: Leo Hoogenboom, Ballston Lake, N.Y.

[73] Assignee: Mechanical Technology Incorporated, Latham, N.Y.

[21] Appl. No.: 823,599

[22] Filed: Jan. 29, 1986

[51] Int. Cl.$^4$ .......................... G01D 5/34; G01J 5/16; G01J 40/14

[52] U.S. Cl. .................................. 250/227; 250/231 R

[58] Field of Search .............. 250/227, 231 R, 231 P, 250/201 AF; 350/96.1, 96.18, 96.25, 96.26, 96.27; 73/705

[56] References Cited

U.S. PATENT DOCUMENTS

| | | | |
|---|---|---|---|
| 3,503,116 | 3/1970 | Strack | 73/705 |
| 3,814,081 | 6/1974 | Mori | 350/96.26 |
| 4,070,116 | 1/1978 | Frosch et al. | 250/201 R |
| 4,141,624 | 2/1979 | Siegmund | 350/96.26 |
| 4,601,537 | 7/1986 | Saccocio | 350/96.27 |

Primary Examiner—David C. Nelms
Assistant Examiner—William L. Oen
Attorney, Agent, or Firm—Joseph V. Claeys; Joseph C. Sullivan

[57] ABSTRACT

An optical proximity detector including a set of transmitter fibers for directing light to a target and two sets of receiver fibers. One set of receiver fibers is combined with the transmitter fibers to from a central portion which is flanked by the second set of receiver fibers. Two light sensors and a signal processing circuit are also included to generate one output signal which is linear with respect to the distance to the target and is independent of the target reflectance. The detector is especially suited for monitoring targets having widths less than the diameter of the bundle, such as a turbine blade.

6 Claims, 5 Drawing Figures

FIBER OPTIC PROXIMITY SENSORS FOR NARROW TARGETS WITH REFLECTIVITY COMPENSATION

This application is related to U.S. application Ser. No. 823,600 titled "A FIBER OPTIC SENSOR WITH TWO BIFURCATED BUNDLES" which has the same inventor and file date and is commonly assigned.

BACKGROUND OF THE INVENTION a. Field of the Invention

This invention pertains to optical proximity sensors with optical fibers used for measuring distance to a target which has a narrower diameter than that of the fiber optic bundles, and more particularly to a system incorporating such sensors and having automatic reflectivity compensation.

b. Description of the Invention

Optical proximity sensors are known in which a distance to a target is determined by directing light from a source through a fiber optic bundle to the target and then measuring the intensity of the light reflected by the target. Typically, the bundle comprises transmitter and receiver fibers (for transmitting light to, and receiving light from the target respectively) which are randomly distributed. This type of bundle was founnd satisfactory for measuring distances to normal targets. However, if the target is narrower than the diameter of the bundle and, furthermore, if the target is moving in a direction transversal to the light path between the bundle and the target (for example, such as rotating turbine blades) then the normal optical proximity sensors perform very poorly. To major factors which influence the performance of normal proximity sensors in such cases are poor linearity between the distance between measured and the intensity of the reflected light and the effects of with and movement of the target with respect to the bundle. While some attempts have been made to compensate for these effects by adding various offsets, these attempts resulted in only marginal improvements.

OBJECTIVES AND SUMMARY OF THE INVENTION

In view of the above, a primary object is to provide a system which reliably determines the distance to a narrow target.

A further objective is to provide a system with an improved automatic reflectivity compensation.

A further objective is to provide a proximity sensor for a moving target.

An optical sensor according to the present invention comprises a light source for illuminating a target, an optical fiber having transmitting fibers for sending light to the target and first and second receiver fibers which conduct light reflected by the target to two light sensors. The two light sensors generate electric signals proportional to the perceived indirect light, said signals being processed in a signal processing circuit to generate a voltage signal proportional to the gap between the bundle and the target. The bundle is constructed such that the transmit and first receiver fibers are arranged in parallel interleaved layers, with the second receiver fibers arranged symmetrically in an outer region of the bundle.

The currents from the two sensors are added after proper scaling and then the sum is used to compensate for changes in the reflectance of the target.

DETAILED DESCRIPTION OF THE INVENTION

Figure 1:
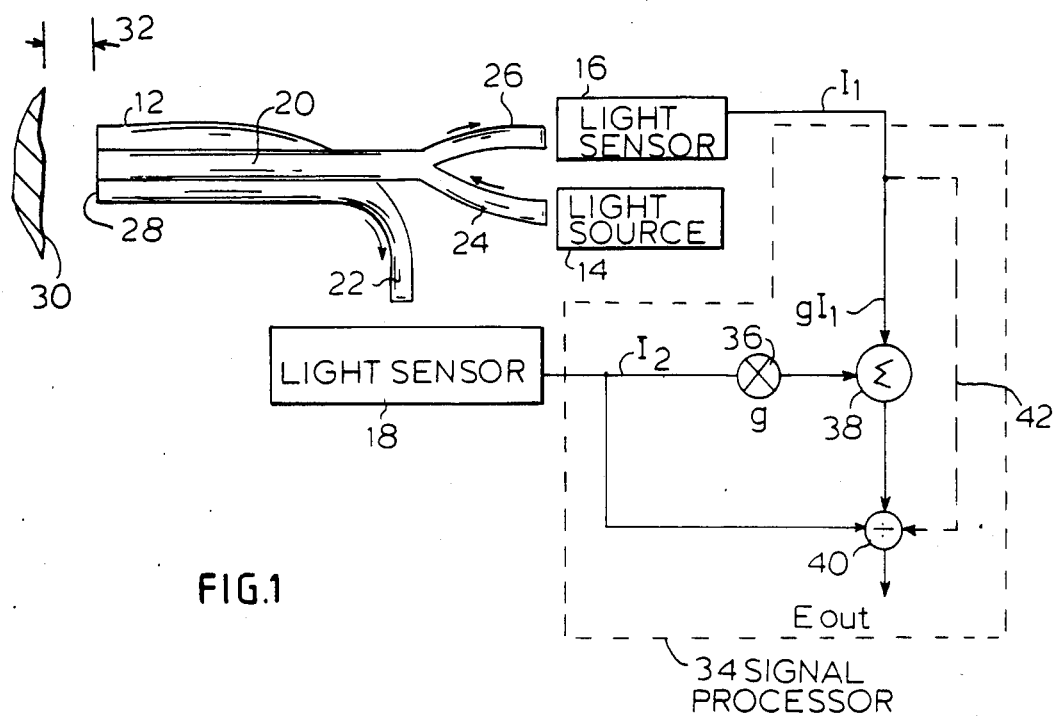
FIG. 1 shows the elements of an optical proximity sensor constructed in accordance with this invention.

Referring now to FIG. 1, an optical proximity sensor comprises a bundle of optical fibers 12, a light source 14, and first and second sensors 16, 18. The bundle 12 is separated into a central section 20 and an outer section 22. The central section is further partitioned into a first leg 24 and a second leg 26. Leg 24 is composed of transmitter fibers for transmitting light from source 14. An end 28 of the bundle is separated from target 30 by a gap 32 as shown. Light from source 14 traverses the bundle 12 and gap 32 and impinges on the target 30. Reflected light from the target is picked-up by the first receiver fibers of the central section 20 and passes through leg 26 to light sensor 16. Reflected light is also picked up by second receiver fibers of the outer section 22 and passes therethrough to light sensor 18. Sensors 16 and 18 are provided to generate electric signals proportional to the light received from the receiver fibers of leg 26 and section 22 respectively.

Figure 2:
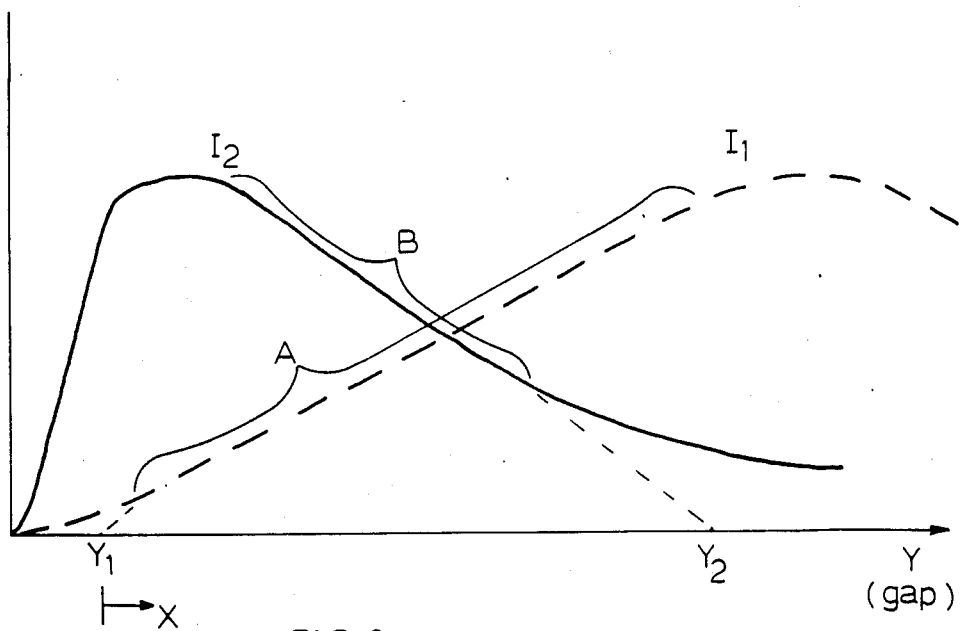
FIG. 2 shows a response curve for the two sensors of FIG. 1.

More specifically, if the gap is placed initially in contact with bundle end 26 and then moved away from it, the signals from sensors 16 and 18 have profile $I_1$ and $I_2$ respectively shown in FIG. 2 with the horizontal axis y indicating the width of gap 32. More particularly, $I_1$ rises gradually so that after an initial distance, it becomes essentially linear over a relatively large range A. $I_2$ on the other hand rises very rapidly until it reaches a peak value and then decays. As shown in FIG. 2, during its decay $I_2$ is also linear in the range B. Therefore, in their linear range the two light intensity signals $I_1$ and $I_2$ may be expressed as:

$$I_1(y) = K_1(y - y_1) \quad (1)$$

and $$I_2(y) = -K_2(y - y_2) \quad (2)$$

where $y_1$ and $y_2$ are the intercepts of the respective lines with the horizontal axis, and $K_1$ and $-K_2$ are the slopes of the lines. For the sake of convenience the lines are translated to the right by $y_1$ along a new horizontal axis x (where $x = y - y_1$), $$I_1(x) = K_1 x \quad (3)$$

and $$I_2(x) = -K_2[x + x + (y_1 - y_2)]. \quad (4)$$

Selecting a constant g to be the ratio of $K_2/K_1$, the following relationship among the coordinates may be derived:

$$C = gI_1(x) + I_2(x) = gK_1x - K_2x - K_2(y_1 - y_2) \quad (5)$$

$$C = (K_2/K_1)K_1x - K_2x - K_2(y_1 - y_2)$$

$$C = -K_2(y_1 - y_2)$$

According to equation (5) C is independent of x, regardless of the values of $I_1$ and $I_2$ (as long as x is within the linear regions A and B defined above).

It has been found experimentally that equations (1)–(5) remain the same even with changes in the intensity of light source 14 or the reflectance of the target as viewed, except for a proportional change in $K_1$ and $K_2$. Gap 32 then may be determined by deriving a ratio signal E which is defined by the expression:

$$E(x) = I_1(x)/(I_2(x) + gI_1(x)) \quad (6)$$

Substituting equations (3) and (5) into equation (6) results $$E(x) = \frac{K_1}{K_2} \frac{x}{y_2 - y_1} = g \frac{x}{y_2 - y_1} \quad (6a)$$

Furthermore, as previously mentioned, $I_1(x)$ changes linearly with respect to x and therefore signal processing as presented by equations 6 and 6(a) will result in a signal that changes linearly with the size of the gap. As is evident from equation 6(a), the ratio signal $E(x)$ thus derived is a linear function only of the gap change (x) and hence of the size of gap 32 and is independent of the surface reflectivity and lamp intensity.

In order to derive signal E, the outputs $I_1$ and $I_2$ are fed to a signal processing circuit 34 comprising a gain stage 36, a summar 38 and a ratioing circuit 40. $I_2$ is fed into gain stage 36 for multiplication by factor g. This factor g is merely a scaling constant which compensates for the different responses of the two light sensors and is empirically determined. The output of 36, $gI_2$ is added by summer 38 to $I_1$ to generate the denominator for the ratioing circuit 40. $I_1$ is also fed to the ratioing circuit 40 to form its numerator.

Alternately, another signal E' may be derived from the equation:

$$E' = \frac{I_2(x)}{I_2 + gI_1} \quad (8)$$

Substitution of equations (4) and (5) into equation (8) results in:

$$E' = \frac{-K_2[x + (y_1 - y_2)]}{-K_2(y_1 - y_2)} = \frac{x}{y_1 - y_2} + 1 \quad (8a)$$

This signal E' per equation (8a) is also linear with respect to the size of gap change (x) and hence to the size of gap 32 and is independent of the reflectance of the target. In signal processor 34, E' may be derived by feeding $I_2$ into ratioing circuit 40 instead of $I_1$, as shown by the broken line 42.

Figure 3:
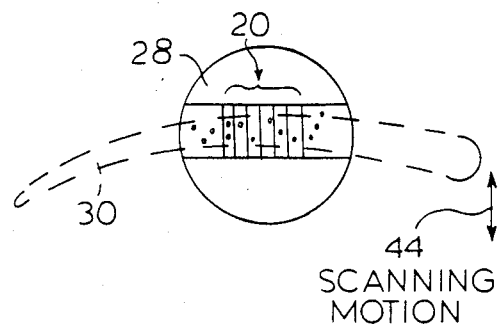
FIG. 3 shows an end view of an optical bundle such as is shown in FIG. 1 and the relationship of said bundle to the target.
Figure 4:
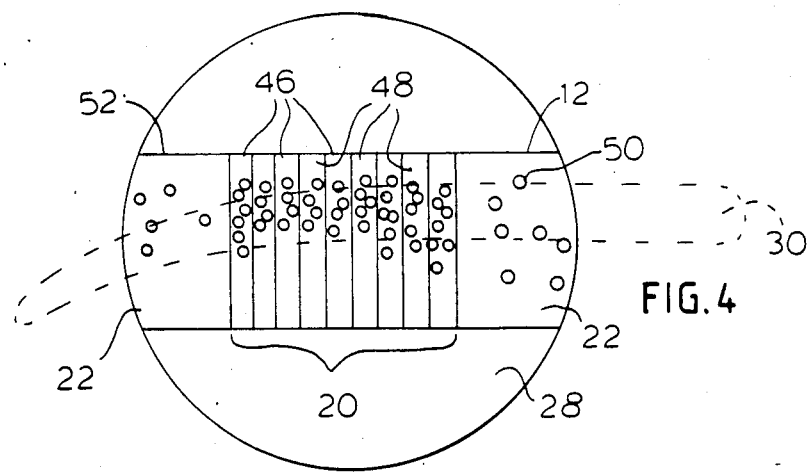
FIG. 4 shows a preferred embodiment of the invention.
Figure 5:
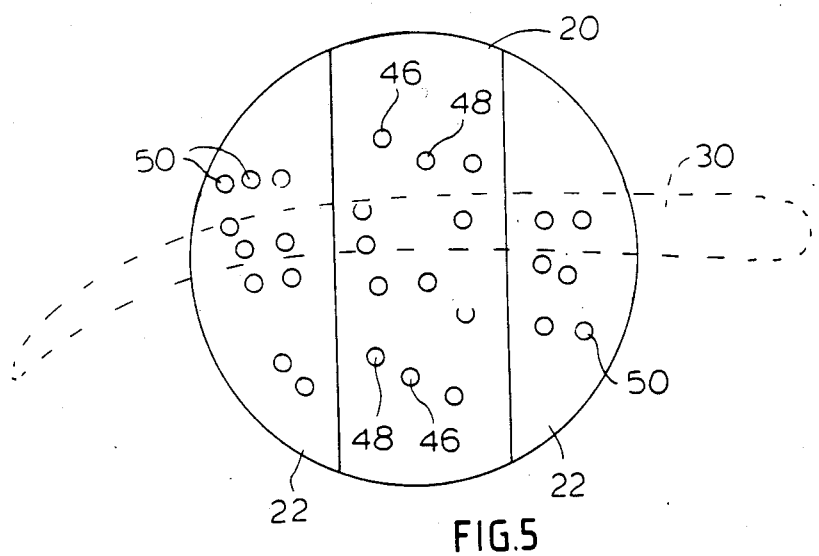
FIG. 5 shows an alternate embodiment.

In order to get the response of FIG. 2, bundle 12 has a special configuration, as illustrated in FIGS. 3, 4, and 5. FIG. 3 shows the end face 28 of the bundle with target 30 (in this case a turbine blade) moving past the face essentially in a vertical motion indicated by arrow 44. As shown in more detail in FIG. 4, the bundle 12 includes a central portion 20 and an outer portion 22 disposed on both sides of the central portion. The central portion preferably comprises nine layers of fibers. The nine layer configuration or set is composed of five layers of transmit fibers 46 interleaved with four layers of receive fibers 48 as shown. Fibers 50 of portion 22 are all receiver fibers as previously mentioned. These layers are oriented in line with respect to the motion of the target 30 indicated in FIG. 3. The fibers may be oriented in a horizontal strip 52 along the diameter of the bundle shown in FIG. 4.

Alternatively, the fibers may be disposed along the whole width of the bundle, as shown in FIG. 5. Furthermore, within vertical portion 20 the receiver and transmitter fibers 48, 46 may be distributed randomly (also shown in FIG. 5) rather than in the ordered layers of FIG. 4.

From face 28, the fibers of the vertical portion are grouped into sections 24 and 26 shown in FIG. 1.

Obviously, numerous modifications may be made to the invention without departing from the scope of the invention as defined in the appended claims.

What is claimed is:

1. An optical proximity detector for determining a distance to a target moving in a preselected direction comprising:
   a. a bundle of optical fibers having a face directed towards the target and including:
      (1) a central portion having transmitter fibers and central receiver fibers; and
      (2) an outer portion having outer receiver fibers; said central and outer portions being arranged in line with respect to said preselected direction;
   b. a light source coupled to said transmitter fibers for directing light to said target;
   c. a first light sensor coupled only to said central receiver fibers for sensing light reflected by the target and generating a corresponding first sensor signal $I_2$;
   d. a second light sensor coupled only to said outer receiver fibers for sensing light reflected by the target and generating a corresponding second sensor signal $I_1$; and
   e. signal processing means connected to said first and second light sensors and functioning to generate an output signal E indicative of said distance in accordance with said signals $I_1$ and $I_2$ wherein said output signal is generated in accordance with the formula $$E = \frac{I_1}{I_2 + gI_1}$$

wherein g is a scaling constant determined from the response characteristics of the first and second sensors.

2. The detector of claim 1 wherein the central portion comprises alternate layers of central receiver fibers and transmitter fibers, said layers being disposed in line with respect to said direction.

3. The detector recited in claim 1 wherein the central portion comprises a uniform mixture of central receiver and transmitter fibers.

4. An optical proximity detector for determining a distance to a target moving in a preselected direction comprising:
   a. a bundle of optical fibers having a face directed towards the target and including:

(1) a central portion having transmitter fibers and central receiver fibers; and
(2) an outer portion having outer receiver fibers; said central and outer portions being arranged in line with respect to said preselected direction;

b. a light source coupled to said transmitter fibers for directing light to said target;

c. a first light sensor coupled only to said central receiver fibers for sensing light reflected by the target and generating a corresponding first sensor signal $I_2$;

d. a second light sensor coupled only to said outer receiver fibers for sensing light reflected by the target and generating a corresponding second sensor signal $I_1$; and e. signal processing means connected to said first and second light sensors and functioning to generate an output signal E indicative of said distance in accordance with said signals $I_1$ and $I_2$ wherein said output signal is generated in accordance with the formula $$E = \frac{I_2}{I_2 + gI_1}$$

wherein g is a scaling constant determined from the response characteristics of the first and second sensors.

5. The detector of claim 4 wherein the central portion comprises alternate layers of central receiver fibers and transmitter fibers, said layers being disposed in line with respct to such direction.

6. The detector recited in claim 4 wherein the central portion comprises a uniform mixture of central receiver and transmitter fibers.

* * * * *

UNITED STATES PATENT AND TRADEMARK OFFICE
CERTIFICATE OF CORRECTION

PATENT NO. : 4,701,610
DATED : October 20, 1987
INVENTOR(S) : Leo Hoogenboom

It is certified that error appears in the above-identified patent and that said Letters Patent are hereby corrected as shown below:

Column 1, line 34, change "To" to --Two--;

line 36, change "between" (second occurrence) to --being--;

line 37, change "with" to --width--;

line 45, change "object" to --objective--;

Column 3, line 21, after "results" insert --in--;

line 35, change "summar" to --summer--;

Column 6, line 15, change "respct" to --respect--.

Signed and Sealed this

Twenty-ninth Day of March, 1988

*Attest:*

DONALD J. QUIGG

*Attesting Officer*          *Commissioner of Patents and Trademarks*